(12) United States Patent
Hsieh

(10) Patent No.: US 12,209,964 B2
(45) Date of Patent: Jan. 28, 2025

(54) BIO-CHIP, BIO-DETECTION SYSTEM AND BIO-DETECTION METHOD

(71) Applicant: VisEra Technologies Company Limited, Hsin-Chu (TW)

(72) Inventor: Hsin-Yi Hsieh, Taoyuan (TW)

(73) Assignee: VisEra Technologies Company Limited, Hsin-Chu (TW)

( * ) Notice: Subject to any disclaimer, the term of this patent is extended or adjusted under 35 U.S.C. 154(b) by 1030 days.

(21) Appl. No.: 17/071,736

(22) Filed: Oct. 15, 2020

(65) Prior Publication Data
US 2022/0120683 A1   Apr. 21, 2022

(51) Int. Cl.
*B01L 3/00* (2006.01)
*G01N 21/64* (2006.01)

(52) U.S. Cl.
CPC ...... *G01N 21/645* (2013.01); *B01L 3/502715* (2013.01); *B01L 3/50855* (2013.01); *G01N 21/6428* (2013.01); *B01L 2200/10* (2013.01); *B01L 2300/0654* (2013.01); *B01L 2300/0819* (2013.01); *B01L 2300/0896* (2013.01); *G01N 2021/6463* (2013.01); *G01N 2201/0683* (2013.01)

(58) Field of Classification Search
CPC .............. G01N 21/645; G01N 21/6428; B01L 3/502715; B01L 2200/10; B01L 2300/0654
See application file for complete search history.

(56) References Cited

U.S. PATENT DOCUMENTS

| | | | | |
|---|---|---|---|---|
| 5,999,316 | A | * | 12/1999 | Allen ................. E06B 9/24 359/488.01 |
| 9,851,302 | B2 | * | 12/2017 | Mattioli Della Rocca ................. G01J 3/2823 |
| 2006/0012872 | A1 | | 1/2006 | Hayashi et al. |
| 2010/0096563 | A1 | | 4/2010 | Ponjee et al. |

(Continued)

FOREIGN PATENT DOCUMENTS

| | | |
|---|---|---|
| CN | 110018139 A | 7/2019 |
| CN | 111202497 A | 5/2020 |

(Continued)

OTHER PUBLICATIONS

Japanese Office Action corresponding to application No. 2021-018074 issued on Aug. 16, 2022 with its English translation; pp. 1-8.

(Continued)

*Primary Examiner* — Jill A Warden
*Assistant Examiner* — Michael Stanley Gzybowski
(74) *Attorney, Agent, or Firm* — Muncy, Geissler, Olds & Lowe, P.C.

(57) ABSTRACT

A bio-chip is provided. The bio-chip includes a first substrate, a polarizing array, and a plurality of reaction sites. The polarizing array is disposed on the first substrate, and includes first sub-polarizing units having a first polarizing angle and second sub-polarizing units having a second polarizing angle. The first polarizing angle is different from the second polarizing angle. The reaction sites are disposed on the polarizing array. Each of the reaction sites corresponds to one of the first sub-polarizing units or one of the second sub-polarizing units.

20 Claims, 9 Drawing Sheets

(56) References Cited

U.S. PATENT DOCUMENTS

| | | | |
|---|---|---|---|
| 2015/0053871 A1* | 2/2015 | Grundfest | G01N 21/6408 250/459.1 |
| 2018/0250672 A1* | 9/2018 | Jamshidi | B01L 3/5088 |
| 2019/0031993 A1* | 1/2019 | Matsunaga | C12M 23/20 |
| 2019/0170904 A1 | 6/2019 | Topolancik et al. | |
| 2019/0383738 A1 | 12/2019 | Sato et al. | |

FOREIGN PATENT DOCUMENTS

| | | |
|---|---|---|
| EP | 3182095 A1 | 6/2017 |
| JP | 2009-276088 A | 11/2009 |
| JP | 2010-032513 A | 2/2010 |
| JP | 2015-523577 A | 8/2015 |
| JP | 2017-515118 A | 6/2017 |
| JP | 2019-519758 A | 7/2019 |
| WO | WO-98/13683 | 4/1998 |
| WO | WO-00/14514 | 3/2000 |
| WO | WO2004036284 A1 | 2/2006 |
| WO | WO-2017184997 A1 | 10/2017 |
| WO | WO2020068412 A1 | 4/2020 |

OTHER PUBLICATIONS

The Search Report corresponding to EP application No. 20211155.5 issued on Feb. 24, 2021.
Office Action and Search Report of CN Application No. 202110012042.7 dated Jul. 3, 2024, 10 pages.

* cited by examiner

BIO-CHIP, BIO-DETECTION SYSTEM AND BIO-DETECTION METHOD

BACKGROUND

Technical Field

The present disclosure relates in general to bio-chips, and in particular, it relates to a bio-chip with a polarizing array and a bio-detection system with a polarizing element.

Description of the Related Art

An integrated sensing device has recently been used for biological analysis. When using such an application, a biological or biochemical sample may be placed on a bio-chip. The bio-reaction or interaction, such as DNA sequencing and immunofluorescence detection, may be reported through the excitation or emission spectrum and/or the intensity of a fluorescent molecule. The fluorescent molecules may be excited by an excitation light with a shorter wavelength and generate an emission light with a longer wavelength toward the photodetector. The spectrum distribution and intensity of the fluorescence may be detected and determined by the photodetector of the bio-detection system.

In the course of bio-chip evolution, the density of the array on the bio-chip has generally increased by reduction in space width or well pitch in order to pursue lower costs and achieve higher throughput. However, such reduction in array size may cause crosstalk between neighboring wells, and each individual fluorescent signal may not be detected precisely, leading to inaccurate analytical results.

Although existing bio-chips have been adequate for their intended purposes, they have not been entirely satisfactory in all respects. Therefore, a novel bio-chip accompanied by a novel bio-detection system and a novel bio-detection method is still in demand.

SUMMARY

In accordance with some embodiments of the disclosure, a bio-chip is provided. The bio-chip includes a first substrate, a polarizing array, and a plurality of reaction sites. The polarizing array is disposed on the first substrate. The polarizing array includes first sub-polarizing units having a first polarizing angle and second sub-polarizing units having a second polarizing angle, wherein the second polarizing angle is different from the first polarizing angle. The reaction sites are disposed on the polarizing array. Each of the reaction sites corresponds to one of the first sub-polarizing units or one of the second sub-polarizing units.

In accordance with some embodiments of the disclosure, a bio-detection system is provided. The bio-detection system includes an excitation light source, a front polarizing element, the aforementioned bio-chip, a lens, and a photodetector. The excitation light source is configured to emit an excitation light. The front polarizing element is configured to polarize the excitation light. The bio-chip is configured to receive the polarized excitation light. The lens is configured to collect an emission light from a bio-sample immobilized on the reaction sites of the bio-chip. The photodetector is configured to detect the emission light.

In accordance with some embodiments of the disclosure, a bio-detection method is provided. The bio-detection method includes the following steps: providing the aforementioned bio-detection system; immobilizing bio-samples on the plurality of reaction sites of the bio-chip; performing a first detecting step to obtain a first fluorescent signal emitted from the bio-samples immobilized on the plurality of reaction sites corresponding to the first sub-polarizing units; performing a second detecting step to obtain a second fluorescent signal emitted from the bio-samples immobilized on the plurality of reaction sites corresponding to the second sub-polarizing units; and combining the first fluorescent signal and the second fluorescent signal.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1A:
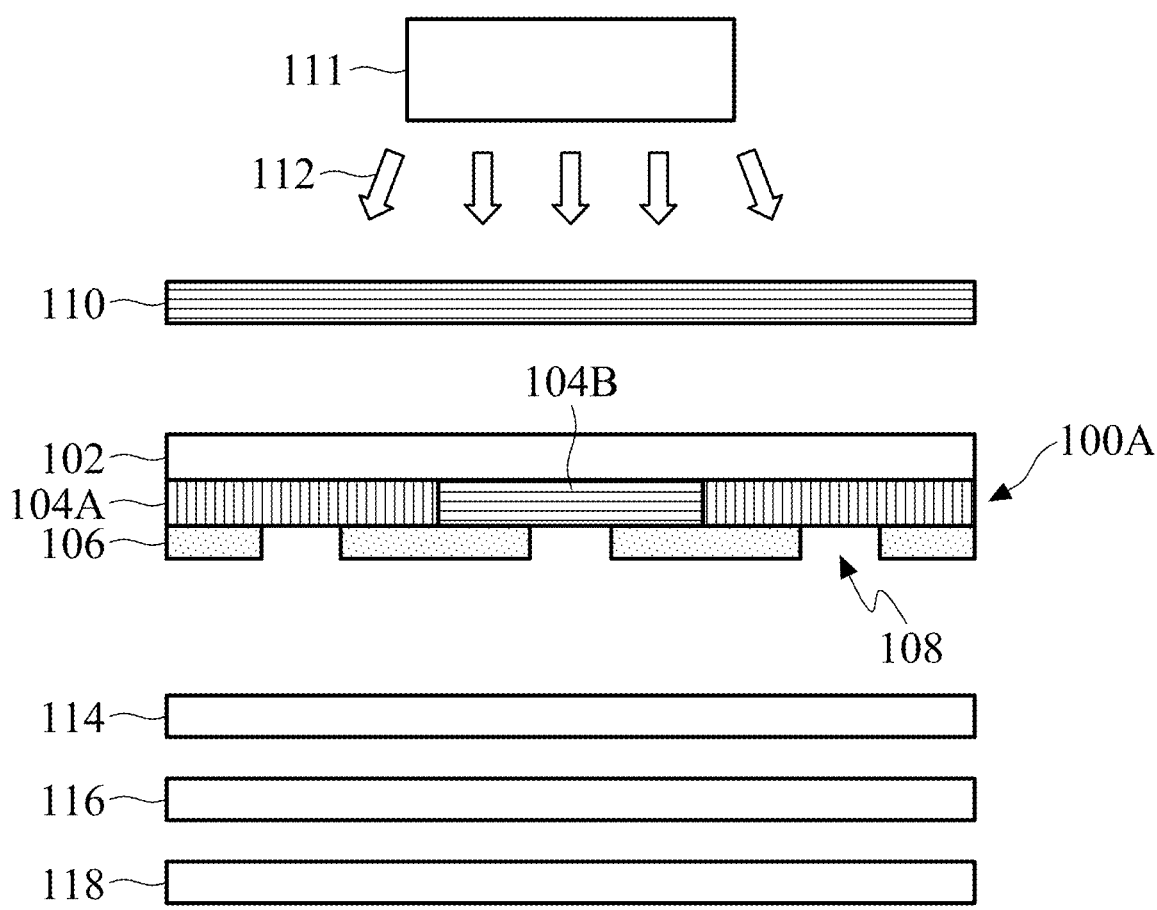
FIGS. 1A-1C are cross-sectional diagrams of a bio-detection system in accordance with some embodiments of the disclosure.

The bio-chip, the bio-detection system and the bio-detection method of the present disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the concept of the present disclosure may be embodied in various forms without being limited to those exemplary embodiments.

In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

In addition, the expressions "a layer overlying another layer", "a layer is disposed above another layer", "a layer is disposed on another layer" and "a layer is disposed over another layer" may indicate that the layer is in direct contact with the other layer, or that the layer is not in direct contact with the other layer, there being one or more intermediate layers disposed between the layer and the other layer.

In addition, in this specification, relative expressions are used. For example, "lower", "bottom", "upper" or "top" are used to describe the position of one element relative to another. It should be appreciated that if a device is flipped upside down, an element that is "lower" will become an element that is "upper".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

The terms "about" and "substantially" typically mean+/−10% of the stated value, more typically mean+/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In accordance with some embodiments of the disclosure, the polarizing array of the bio-chip may include first sub-polarizing units having a first polarizing angle and second sub-polarizing units having a second polarizing angle. The first polarizing angle is different from the second polarizing angle. In addition, according to some embodiments of the disclosure, the bio-detection system may include a front polarizing element that is orientable by rotation to have the same polarizing angle as the first polarizing angle or the second polarizing angle. With such configurations accompanied by a two-step detecting method, crosstalk between fluorescent signals of neighboring reaction sites may be reduced, and the bio-chip may be fabricated with higher array density.

Figure 1B:
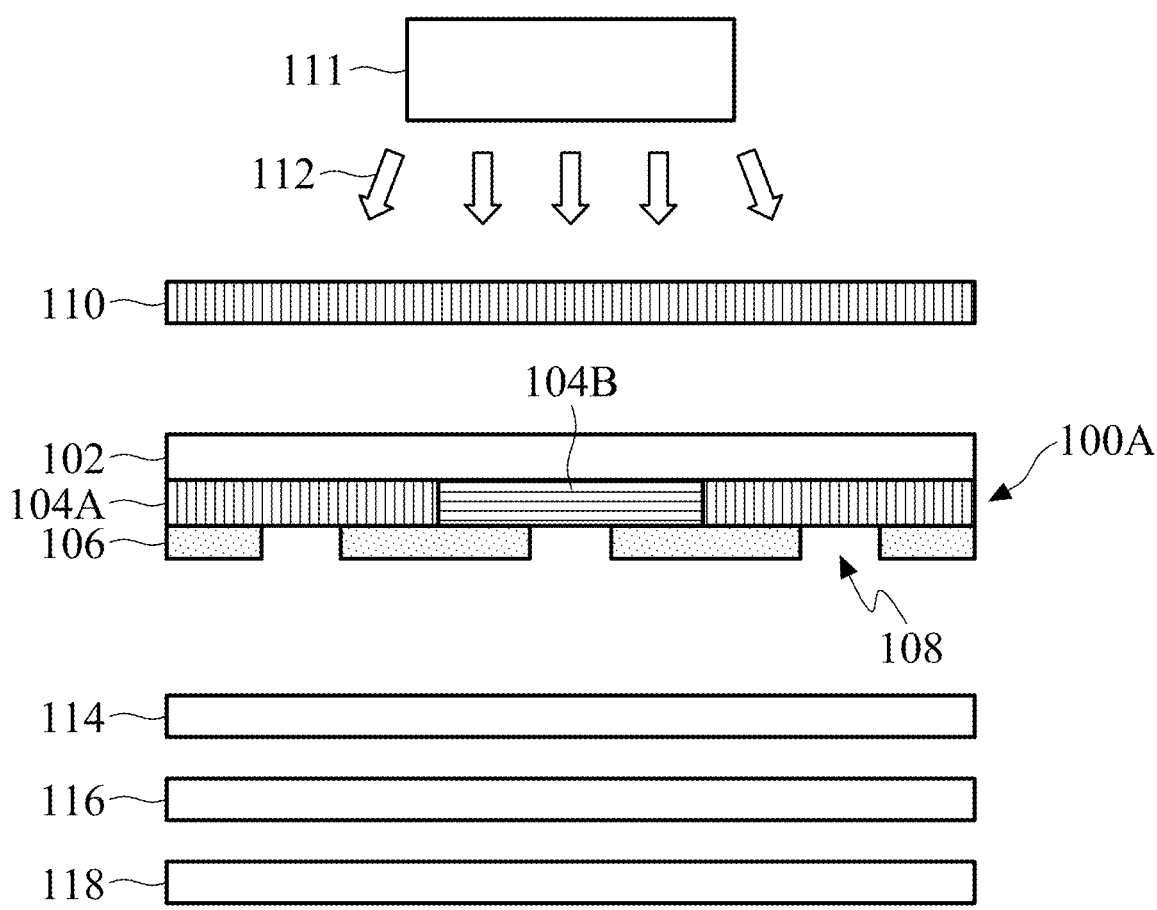

FIGS. 1A-1B are cross-sectional diagrams of a bio-detection system 10A in accordance with some embodiments of the disclosure. It should be understood that additional features may be added to the bio-detection system 10A in accordance with some embodiments of the disclosure.

Referring to FIG. 1A, the bio-detection system 10A includes a bio-chip 100A. The bio-chip 100A includes a first substrate 102, a polarizing array 104, and a plurality of reaction sites 108 defined between a sample isolation layer 106. The first substrate 102 may include any suitable materials. In some embodiments, the first substrate 102 may be a flexible material, such as polyethylene terephthalate (PET), polysulfone (PES), polyimide (PI), polycarbonate (PC), polymethylmethacrylate (PMMA), silicone, epoxy, or a combination thereof. In other embodiments, the first substrate 102 may be a rigid material, such as a glass substrate or a sapphire substrate. Also, the first substrate 102 may be transparent or semi-transparent. More specifically, in the embodiments where the first substrate 102 is transparent, the material of the first substrate 102 may have a light transmittance to light with a wavelength in a range from 400 nm to 750 nm greater than 85%, or preferably greater than 92%. In the embodiments where the first substrate 102 is semi-transparent, the material of the first substrate 102 may have a light transmittance to light with a wavelength in a range from 400 nm to 750 nm greater than 25% and less than 85%.

The polarizing array 104 is disposed on the first substrate 102. In some embodiments, the polarizing array 104 may include first sub-polarizing units 104A and second sub-polarizing units 104B. The first sub-polarizing units 104A have a first polarizing angle, and the second polarizing units 104B have a second sub-polarizing angle. The term "polarizing angle" used herein means that the light polarizing at an angle of 90° shift or perpendicular to the polarizing angle cannot pass through the sub-polarizing unit having this polarizing angle. The difference of the absolute values between the first polarizing angle and the second polarizing angle may be greater than 0° and less than 180°, such as 0°, 45°, 90°, 135°, or 180°. In some certain embodiments, the difference of the absolute values between the first polarizing angle and the second polarizing angle may be 90°. Although the polarizing array 104 of the bio-chip 100A is illustrated as having two kinds of sub-polarizing units in FIG. 1A, the present disclosure is not limited thereto. In other embodiments, the polarizing array 104 may further include third sub-polarizing units and even fourth sub-polarizing units (not shown) with different polarizing angles from the first sub-polarizing units 104A and the second sub-polarizing units 104B.

The polarizing array 104 may include a layer of metal wire grating. The material of the polarizing array 104 may be an opaque material, such as aluminum (Al), gold (Au), silver (Ag), titanium (Ti), niobium (Nb) or a combination thereof. In some embodiments, the metal wire grating may have a film thickness of about 20 to about 300 nm. In some embodiments, the metal wire grating may have a period of about 20 nm to about 400 nm. In some embodiments, the metal wire grating may have a filling ratio (or duty cycle) of about 0.2 to about 0.8. The orientation of grating ridge mainly affects the transmission percentage of a polarized light. For example, when the polarized light is parallel, 45° shifted, or 90° shifted, to the orientation of the first sub-polarizing units 104A or the second sub-polarizing units 104B, the transmission light intensity after passing through the sub-polarizing units is the maximum, about 50%, or minimum, respectively. Therefore, when the excitation light is a polarized light with 90° shift to the sub-polarizing units, the sub-polarizing units below the reaction sites will block the excitation light from passing through the sub-polarizing units.

In addition to the polarizing angle of the sub-polarizing units, the extinction ratio of the blocking efficiency may be also affected by the film thickness, grating period, grating profile, and filling ratio of the metal wire. It has been simulated in Peng Li et al. "Investigation of achromatic micro polarizer array for polarization imaging in visible-infrared band." Optik, vol 158. April 2018, pp. 1427-1435 that the extinction ratio could reach $10^4$ (equivalent to an optical density (OD) of 4) using aluminum wire with a thickness of 160 nm, a filling ratio of 0.5, and a period of 150 nm. In some embodiments, a light illumination system with an optical density of greater than 3 for blocking the excitation light may be sufficient for bio sensing applications.

The reaction sites 108 are disposed on the polarizing array 104. Each of the reaction sites 108 may correspond to one of the first sub-polarizing units 104A or one of the second sub-polarizing units 104B. In some embodiments, the reaction sites 108 may be formed as nanowells or nanopatterns. In FIG. 1A, the reaction sites 108 are defined by openings in the sample isolation layer 106 as shown in FIG. 1A. Therefore, the bottom surface of the reaction sites 108 may be the top surface of the polarizing array 104. In other embodiments, the sample isolation layer 106 may not have openings as shown in FIG. 1A. The reaction sites 108 may be formed by modifying a portion of the surface of the sample isolation layer 106 so that only the modified portion can capture the pre-determined bio-samples. For example, some of the functional groups on the surface of the sample isolation layer 106 may be modified to capture the desired bio-samples.

In addition, the sample isolation layer 106 where the reaction sites 108 are disposed may be further modified to enhance bio-sample immobilization. For example, in some embodiments, the sample isolation layer 106 may be coated or treated with self-assembly monolayers (SAMs), functional polymers, or hydrogels for bio-sample immobilization on the reaction sites 108. In other embodiments, the sample isolation layer 106 may not be modified. Bio-samples may be immobilized on the reactions sites 108 depending on their weight, size, surface charge, or van der Waals force and so on.

The sample isolation layer 106 may be formed using sputtering, evaporation, spin-coating, chemical vapor deposition (CVD), molecular beam deposition, any other suitable process or a combination thereof. For example, the chemical vapor deposition process may include low-pressure chemical vapor deposition (LPCVD), low-temperature chemical vapor deposition (LTCVD), rapid thermal chemical vapor deposition (RTCVD), plasma enhanced chemical vapor deposition (PECVD), atomic layer deposition (ALD), or a combination thereof.

In accordance with some embodiments, the material of the sample isolation layer 106 may be transparent, semi-transparent, or opaque. More specifically, in the embodiments where the sample isolation layer 106 is transparent, the material of the sample isolation layer 106 may have a light transmittance to light with a wavelength in a range from 400 nm to 750 nm greater than 85%, or preferably greater than 92%. In the embodiments where the sample isolation layer 106 is semi-transparent, the material of the sample isolation layer 106 may have a light transmittance to light with a wavelength in a range from 400 nm to 750 nm greater than 25% and less than 85%. In the embodiments where the sample isolation layer 106 is opaque, the material of the sample isolation layer 106 may have a light transmittance to light with a wavelength in a range from 400 nm to 750 nm less than 10%, or preferably less than 5%.

The material of the sample isolation layer 106 may include metal, metal alloy, metal oxides, metal nitrides, silicon, silicon oxides, silicon nitrides, or a combination thereof. In some embodiments, the metal, metal alloy, metal oxides, metal nitrides may include, but are not limited to, silver (Ag), aluminum (Al), gold (Au), niobium (Nb), titanium (Ti), tungsten (W), an alloy thereof, titanium oxide (e.g., $TiO_2$), tantalum oxide (e.g., $Ta_2O_5$), aluminum oxide (e.g., $Al_2O_3$), niobium oxide (e.g., $Nb_2O_5$), titanium nitride, tantalum nitride, or a combination thereof.

Still referring to FIG. 1A, the bio-detection system 10A further includes an excitation light source 111. The excitation light source 111 may be configured to emit an excitation light 112. In some embodiments, the excitation light source 111 may include a plurality of sub-excitation light sources (not shown), and each of the sub-excitation light sources may emit an excitation light with one excitation light wavelength. In some embodiments, the sub-excitation light sources may emit multiple excitation lights with various excitation light wavelengths in turns. For example, the sub-excitation light sources with different excitation light wavelengths may emit excitation lights sequentially. Alternatively, the sub-excitation light sources may emit excitation lights in groups. In some embodiments, the excitation light source 111 is a monochromator that continuously emits lights from a short wavelength to a long one (or from a long wavelength to a short one). For example, the monochromator may emit lights with wavelengths ranging from about 200 nm to about 1000 nm.

Referring to FIGS. 1A and 1B, the bio-detection system 10A further includes a front polarizing element 110. The front polarizing element 100 may be configured to polarize the excitation light 112 emitted from the excitation light source 111. Accordingly, the bio-chip 100A may receive the excitation light 112 that is polarized by the front polarizing element 100. In some embodiments, as shown in FIGS. 1A and 1B, the front polarizing element 110 may be orientable by rotation so that the front polarizing element 110 may have the same polarizing angle as either the first polarizing angle of the first sub-polarizing units 104A (shown in FIG. 1B) or the second polarizing angle of the second sub-polarizing units 104B (shown in FIG. 1A). For example, in FIG. 1A, the front polarizing element 110 is oriented to have the second polarizing angle so that the polarized excitation light may pass through the second sub-polarizing units 104B. In FIG. 1B, the front polarizing element 110 is oriented to have the first polarizing angle so that the polarized excitation light may pass through the first sub-polarizing units 104A.

Still referring to FIG. 1A, the bio-detection system 10A may further include a lens 114 and a photodetector 118. The lens 114 may be any suitable optical lens that may collect the emission light from bio-samples after the bio-samples are illuminated by the polarized excitation light. The photodetector 118 may be configured to detect the emission light. The photodetector 118 may be a photodiode, or any suitable light sensing component that can convert measured light into current signals. In the embodiments where the photodetector 118 is a photodiode, the photodetector 118 may be connected to a source and a drain of a metal-oxide-semiconductor (MOS) transistor (not shown) that may transfer the current to another components, such as another MOS transistor. The another component may include, but is not limited to, a reset transistor, a current source follower or a row selector for transforming the current into digital signals.

In some embodiments, the bio-detection system 10A may further include a filter element 116. For example, the filter element 116 may be a rejection filter that may filter the excitation light from entering the photodetector 118. In some embodiments, the filter element 116 may be disposed in the optical path between the lens 114 and the photodetector 118 as shown in FIG. 1A, but the disclosure is not limited thereto. In other embodiments, the filter element 116 may be also disposed in the optical path between the bio-chip 100A and the lens 114. In some embodiments, the filter element 116 may include an absorption filter, an interference filter, a plasmonic metasurface structure, a dielectric metasurface structure, or a combination thereof.

As described above, according to the embodiments of the disclosure, the polarizing array of the bio-chip may include first sub-polarizing units having the first polarizing angle and second sub-polarizing units having the second polarizing angle. The first polarizing angle is different from the second polarizing angle. Additionally, according to the embodiments of the disclosure, the bio-detection system may include a front polarizing element that is orientable by rotation to have the first polarizing angle of the first sub-polarizing units or the second the second polarizing angle of the second sub-polarizing units. By this way, the bio-detection system may sequentially detect bio-samples corresponding to different types of sub-polarizing units, and then the fluorescent signals may be combined to obtain a complete and accurate analytical result. Accordingly, cross-talk between neighboring reaction sites in each image may be reduced for better spatial resolution, and the bio-chip may be fabricated with higher array density.

Figure 1C:
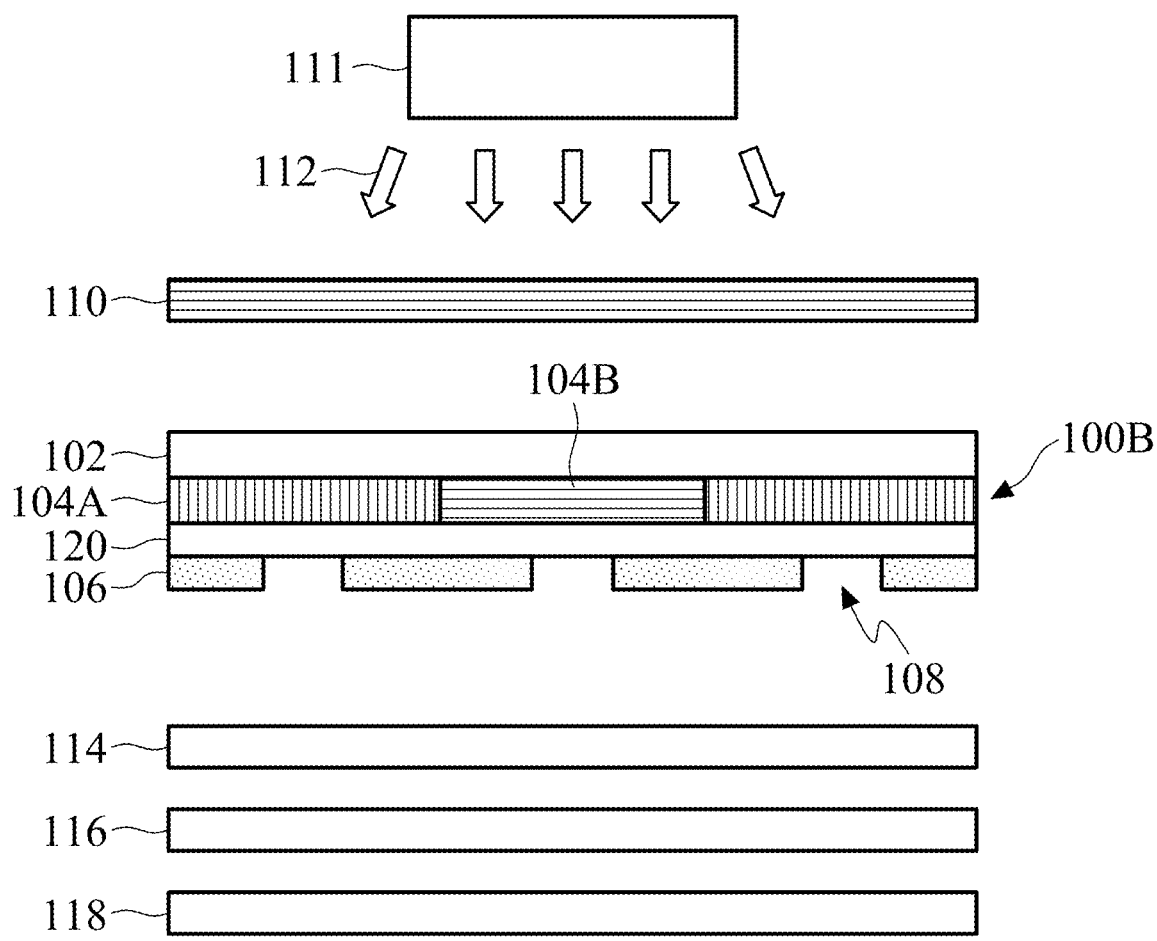

Next, referring to FIG. 1C, FIG. 1C is a cross-sectional diagram a bio-detection system 10B in accordance with other embodiments of the disclosure. The bio-detection system 10B in FIG. 1C is similar to the bio-detection system 10A in FIGS. 1A and 1B, except that the bio-system 10B may include bio-chip 100B that further includes a planarization layer 120 disposed between the reaction sites 108 and the polarizing array 104.

The planarization layer 120 may cover the surface of the polarizing array 104 facing the sample isolation layer 106, and provide a flat surface for the sample isolation layer 106. In addition, a portion of the planarization layer 120 may be exposed through the reaction sites 108 defined by openings of the sample isolation layer 106.

In some embodiments, the material of the planarization layer 120 may include silicon oxide ($SiO_2$), amorphous silicon (a-Si), aluminum oxide ($Al_2O_3$), niobium oxide ($Nb_2O_5$), polymer, or a combination thereof. For example, the polymer may include, but is not limited to, bisbenzocyclobutene (BCB), polyimide (PI), polymethylmethacrylate (PMMA), cycloolefin polymer (COP), polycarbonate (PC), another suitable material, or a combination thereof. In accordance with some embodiments, the planarization layer 120 may be transparent or semi-transparent. More specifically, in the embodiments where the planarization layer 120 is transparent, the material of the planarization layer 120 may have a light transmittance to light with a wavelength in a range from 400 nm to 750 nm greater than 85%, or preferably greater than 92%. In the embodiments where the planarization layer 120 is semi-transparent, the material of the planarization layer 120 may have a light transmittance to light with a wavelength in a range from 400 nm to 750 nm greater than 25% and less than 85%.

Figure 1D:
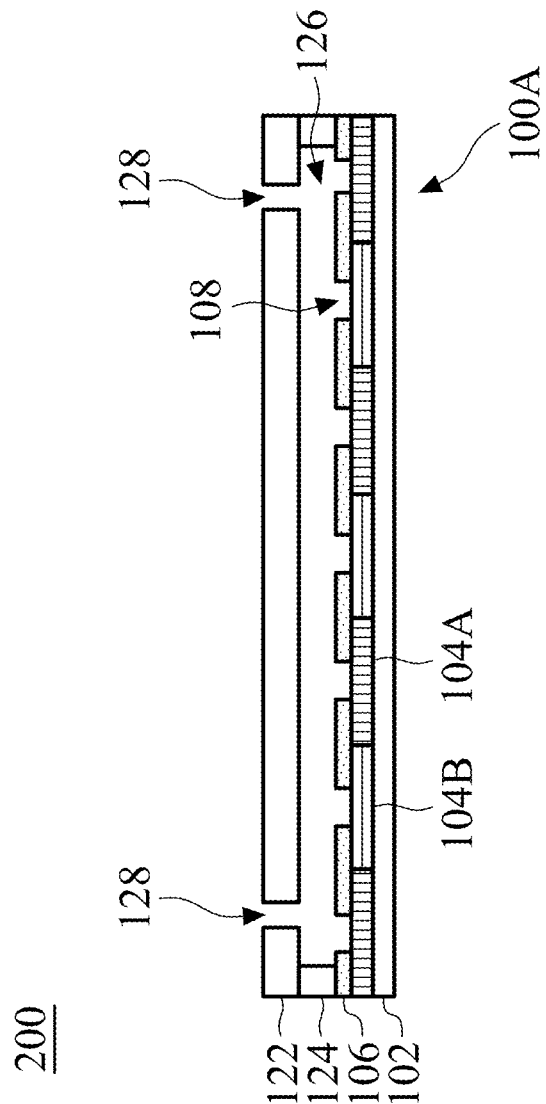
FIG. 1D is a cross-sectional diagram of a bio-chip in accordance with some embodiments of the disclosure.

Referring to FIG. 1D, FIG. 1D is a cross-sectional diagram of a bio-chip 200 in accordance with other embodiments of the disclosure. The bio-chips 100A described in the above embodiments are examples of open chamber bio-chips, and the bio-chip 200 shown in the embodiments of FIG. 1D is an example of flow cell bio-chips. As shown in FIG. 1D, the flow cell bio-chip 200 may include the bio-chip 100A, a second substrate 122, a spacer layer 124, and a microfluidic channel 126 defined between the first substrate 102 of the bio-chip 100A and the second substrate 122. The second substrate 122 may be disposed opposite to the first substrate 102 of the bio-chip 100A. The material of the second substrate 122 may be the same as or similar to the material of the first substrate 102 described above, and thus is not repeated herein.

The spacer layer 124 is disposed between the first substrate 102 of the bio-chip 100A and the second substrate 122. In some embodiments, the spacer layer 124 may include an adhesive material, such as epoxy acrylate (EA), polyurethane (PU), polyether acrylate, polyester acrylate (PEA), or a combination thereof. In some embodiments, the spacer layer 124 may further include other materials, such as silicon oxide ($SiO_2$), amorphous silicon (a-Si), polymer, or a combination thereof. For example, the polymer may include, but is not limited to, bisbenzocyclobutene (BCB), polyimide (PI), polymethylmethacrylate (PMMA), cycloolefin polymer (COP), polycarbonate (PC), another suitable material, or a combination thereof.

According to other embodiments of the disclosure, the second substrate 122 and the spacer layer 124 may be formed in the same process so that the second substrate 122 and the spacer layer 124 are integrated as the same structure. In the embodiments in which the second substrate 122 and the spacer layer 124 are integrated as the same structure, polydimethylsiloxane (PDMS) may be used for forming the second substrate 122 and the spacer layer 124. After the second substrate 122 and the spacer layer 124 are formed, the second substrate 122 and the spacer layer 124 may be attached to the first substrate 102 by a surface arc treatment or a surface plasma treatment. In some embodiments, the spacer layer 124 may have a thickness ranging from about 25 μm to about 1000 μm, preferably from about 50 μm to about 500 μm, more preferably from about 50 μm to about 200 μm.

The microfluidic channel 126 may be defined between the first substrate 102 of the bio-chip 100A and the second substrate 122. In FIG. 1D, the reaction sites 108 may face the microfluidic channel 126. Openings 128 may be formed through the second substrate 122 as an inlet and an outlet for bio-samples, but the disclosure is not limited thereto. In other embodiments, the openings may not formed on the second substrate 122. Instead, openings may be formed on the side of the bio-chip 100A. In particular, the openings may be formed in the region on the bio-chip 100A outside the region where the reaction sites 108 are disposed (not shown). The microfluidic channel 126 may guide bio-samples to the reaction sites 108, and the bio-samples may be immobilized on the reaction sites 108.

Figure 1E:
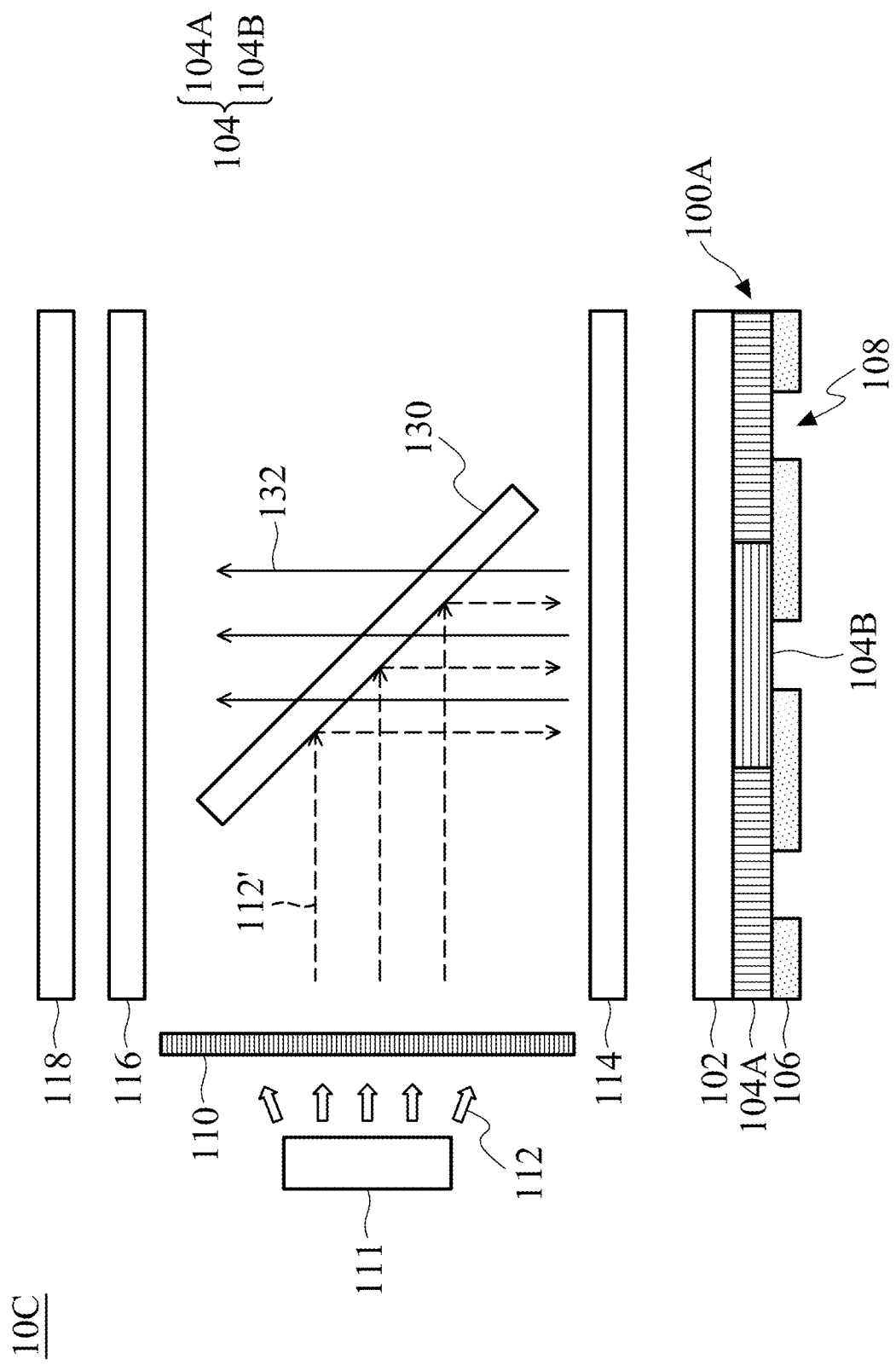
FIG. 1E is a cross-sectional diagram of a bio-detection system in accordance with other embodiments of the disclosure.

Next, referring to FIG. 1E, FIG. 1E is a cross-sectional diagram of a bio-detection system 10C in accordance with other embodiments of the disclosure. The bio-detection system 10C in FIG. 1E is similar to the bio-detection system 10A in FIGS. 1A and 1B, except that the bio-detection system 10C uses reflective apparatus to direct the excitation light toward the bio-chip 100A.

As shown in FIG. 1E, the bio-detection system 10C may further include a light splitting element 130 as the reflective apparatus that may direct the excitation light toward the bio-chip 100A. In some embodiments, the light splitting element 130 may be disposed in the optical path between the lens 114 and the filter layer 116. According to some embodiments of the disclosure, the light splitting element 130 may include a dichroic filter (i.e. an interference filter) with a reflection property for a short wavelength less than 580 nm and a transmission property for long wavelength greater than 580 nm. The cutoff wavelength for reflection and transmission may be changed based on the excitation and emission properties of fluorescent molecules. Owing to the light spectrum difference between the polarized excitation light 112' and the emission light 132 from bio-samples, the light splitting element 130 may allow the polarized excitation light 112' to reflect toward the bio-chip 100A, and may allow the emission light 132 to pass through. According to some other embodiments, the light splitting element 130 may include a beam splitter with a splitting ratio of 50/50, but the present disclosure is not limited thereto. In some further embodiments, the light splitting element 130 may be also a beam splitter with a splitting ratio other than 50/50, such as 60/40 or 70/30. In some embodiments, the beam splitter may be a cube beam splitter, a plate beam splitter, or a pellicle beam splitter.

In FIG. 1E, the front polarizing element 110 is disposed in the optical path between the excitation light source 111 and the light splitting element 130, but the disclosure is not limited thereto. In other embodiments, the front polarizing element 110 may be disposed in the optical path between the lens 114 and the bio-chip 100A (not shown).

Figure 2A:
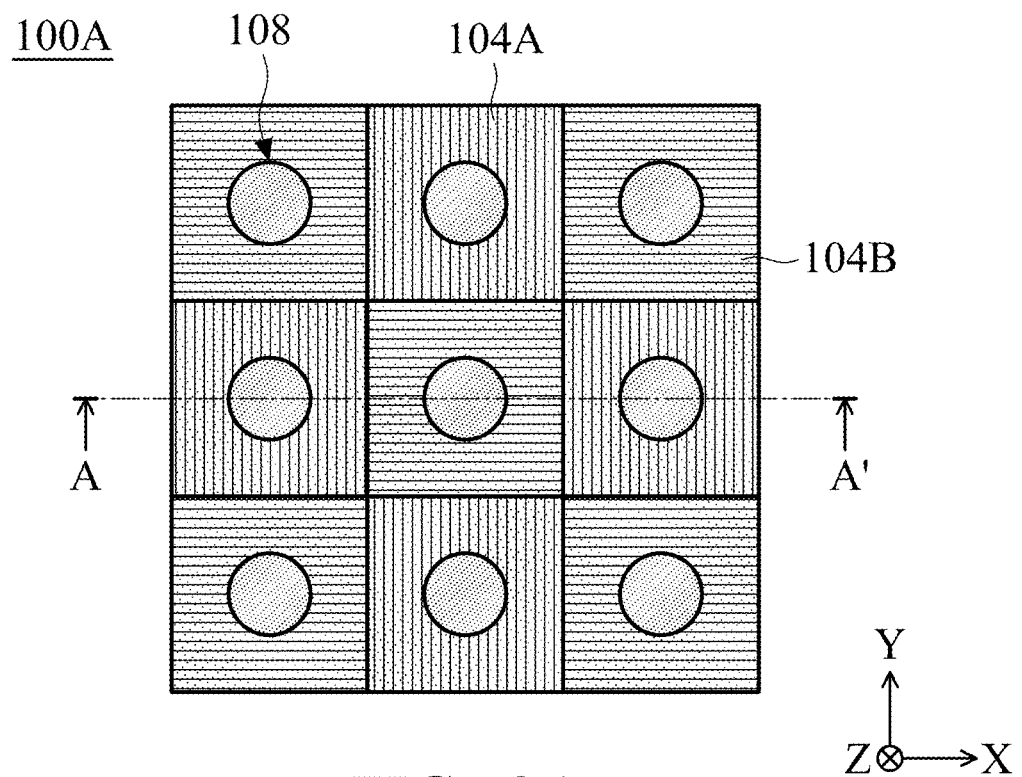
FIGS. 2A-2B are top-view diagrams of a bio-chip in accordance with some embodiments of the disclosure.
Figure 2B:
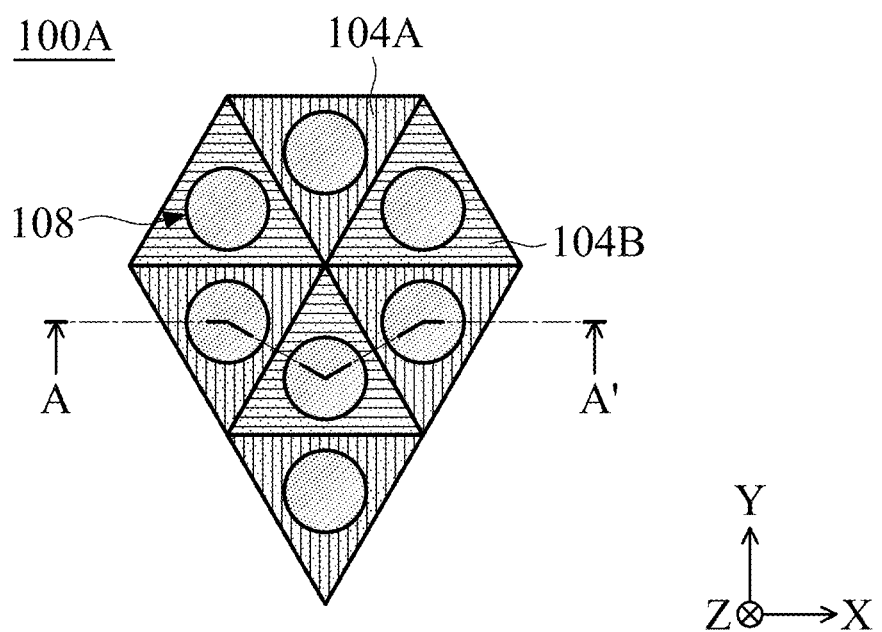

Referring to FIGS. 2A and 2B, FIGS. 2A and 2B are top-view diagrams of the bio-chip 100A in accordance with some embodiments of the disclosure. As shown in FIGS. 2A and 2B, the first sub-polarizing units 104A and the second sub-polarizing units 104B may have a rectangular shape or a triangular shape. In other embodiments, the first sub-polarizing units 104A and the second sub-polarizing units 104B may have a hexagonal shape (not shown). It should be noted that the cross-sectional diagrams of FIGS. 1A and 1B are taken along the line A-A' in FIG. 2A or 2B. In addition, in FIGS. 2A and 2B, the sample isolation layer 106 is omitted merely for simplicity.

As shown in either FIG. 2A or FIG. 2B, at least one of the first sub-polarizing units 104A may be directly adjacent to the second sub-polarizing units 104B, and may be spaced apart from other first sub-polarizing units 104A by the second sub-polarizing units 104B. The term "direct adjacent" described herein means that at least one of the first sub-polarizing units 104A may share the same edge with second sub-polarizing units 104B. With such arrangement, crosstalk between fluorescent signals corresponding to the first sub-polarizing units 104A and the second sub-polarizing units 104B may be reduced, and a higher spatial resolution of fluorescent imaging may be achieved accordingly.

Figure 3:
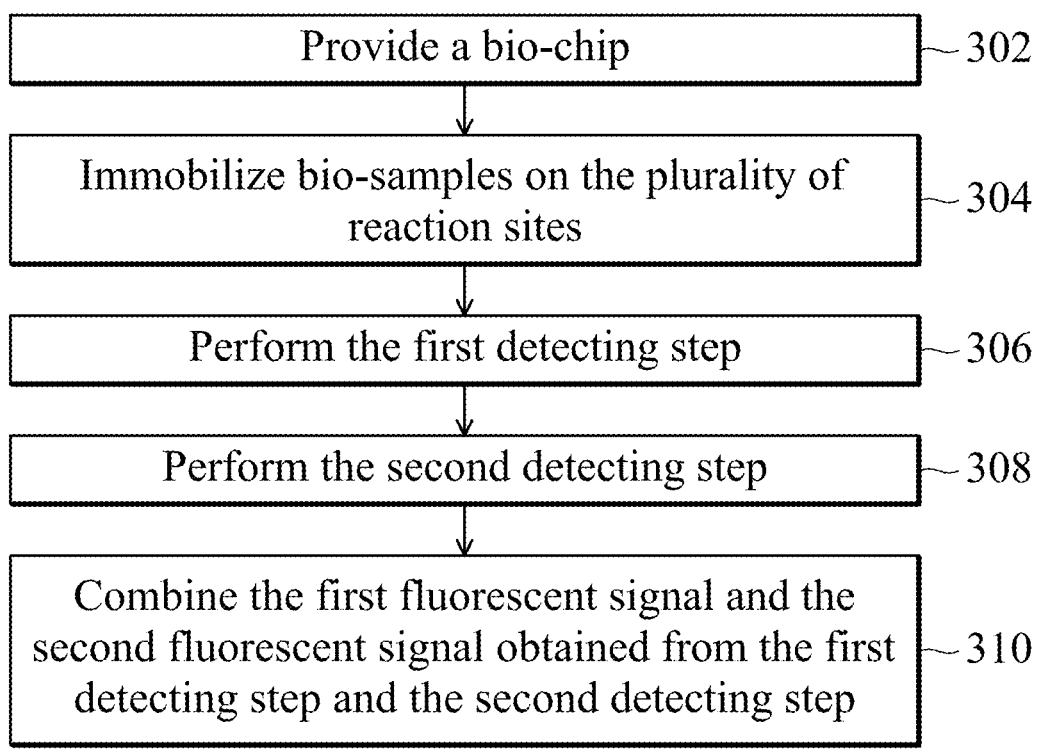
FIG. 3 is a flow diagram of a bio-detection method in accordance with some embodiments of the disclosure.
Figure 4A:
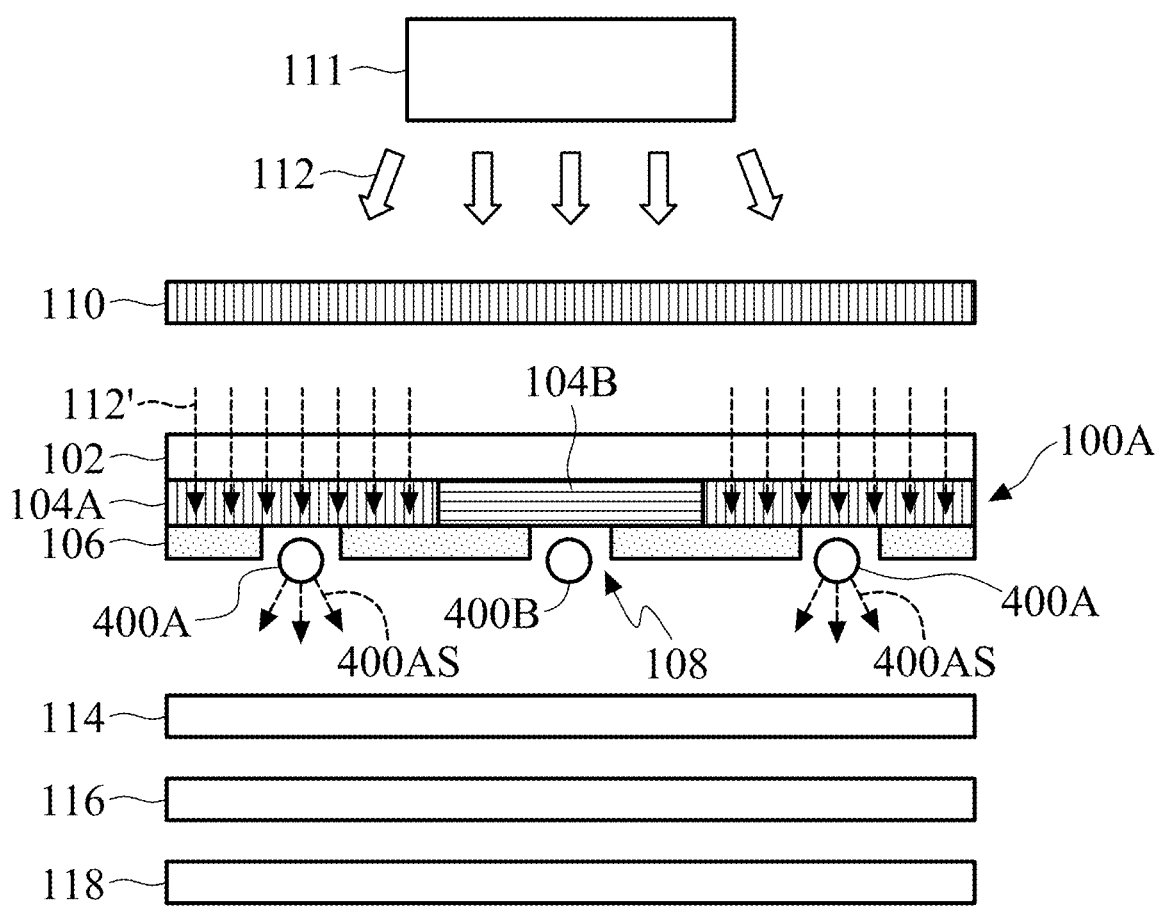
FIGS. 4A-4B illustrate the detection of bio-samples using a bio-detection system in accordance with some embodiments of the disclosure.
Figure 4B:
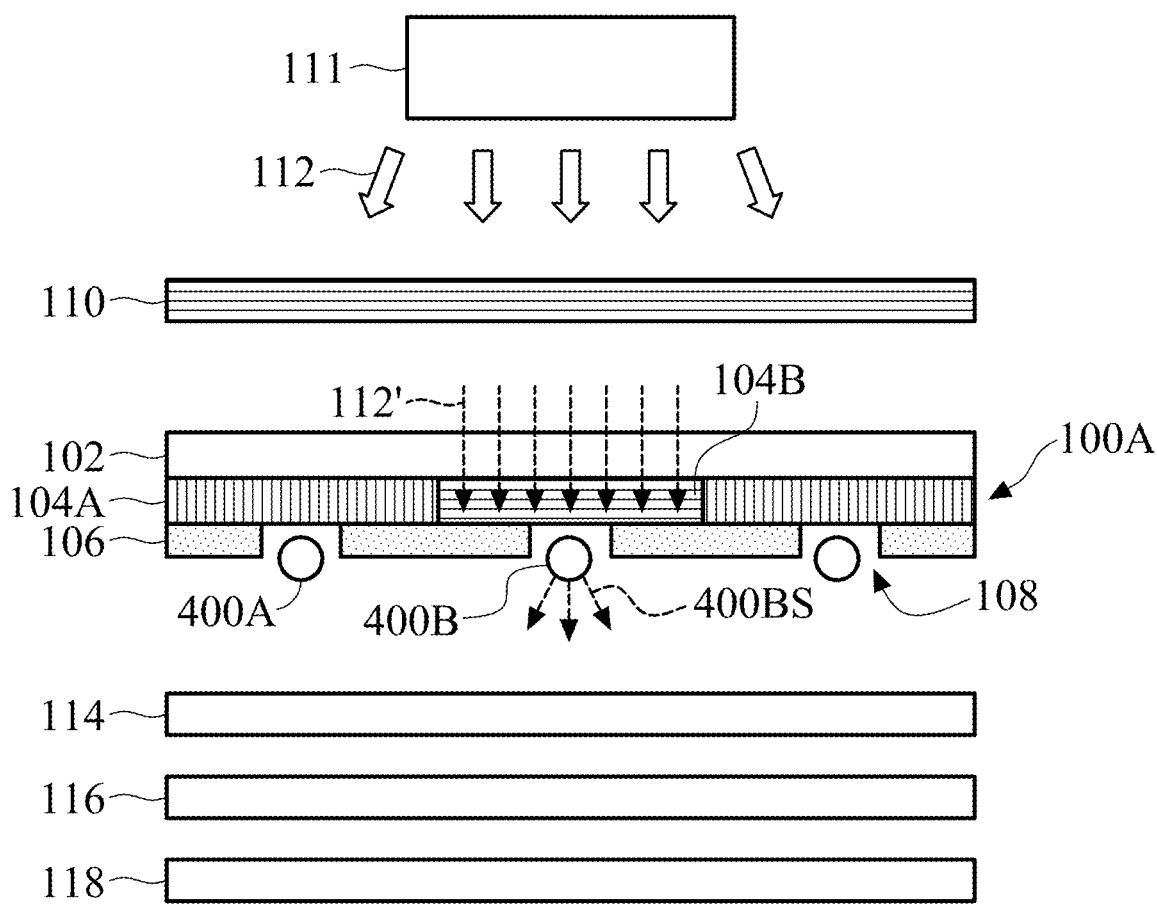

The disclosure further provides a bio-detection method using the bio-detection system described in the above embodiments. Referring to FIGS. 3 and 4A-4B, FIG. 3 is a flow diagram of a bio-detection method 300 in accordance with some embodiments of the disclosure, and FIGS. 4A-4B illustrate the detection of bio-sample 400A and 400B using a bio-detection system 10A in accordance with some embodiments of the disclosure. The bio-detection method 300 may include the following steps. The bio-detection method 300 starts with step 302 to provide the bio-chip 100A that is included in the bio-detection system 10A.

Next, referring to step 304 of FIG. 3 and FIG. 4A, the bio-samples 400A and 400B are immobilized on the reaction sites 108. In particular, an appropriate amount of solution containing bio-samples is applied onto the bio-chips 100A. After the solution containing the bio-samples is dried, excess residues of the bio-samples are removed from the region other than the reaction site 108, and the bio-samples may be immobilized on each of the reaction site 108. In FIG. 4A, the bio-samples 400A refer to the bio-samples immobilized on the reactions sites 108 corresponding to the first sub-polarizing units 104A, and the bio-samples 400B refer to the bio-samples immobilized on the reactions sites 108 corresponding to the second sub-polarizing units 104B.

In some embodiments, the bio-samples 400A and 400B may include, but is not limited to, biomolecules, chemical molecules, or a combination thereof. In some embodiments, the biomolecules may include, but is not limited to, DNA, RNA, proteins, or a combination thereof. In accordance with some embodiments, the bio-samples 400A and 400B may be analyzed to determine a gene sequence, DNA-DNA hybridization, single nucleotide polymorphisms, protein interactions, peptide interactions, antigen-antibody interactions, glucose monitoring, cholesterol monitoring, and the like.

Next, referring to step 306 of FIG. 3 and FIG. 4A, the first detecting step is performed to obtain a first fluorescent signal 400AS emitted from the bio-samples 400A immobilized on the reaction sites 108 corresponding to the first sub-polarizing units 104A. In particular, the front polarizing element 110 is oriented to have the same polarizing angle as the first polarizing angle of the first sub-polarizing units 104A. The bio-samples 400A are irradiated with the polarized excitation light 112' that passes through the front polarizing element 110 and the first sub-polarizing units 104A. Meanwhile, the bio-samples 400B are not irradiated with the polarized excitation light 112' since the second sub-polarizing units 104B block the polarized excitation light 112', and thus no fluorescent signal is generated from the bio-samples 400B, thereby avoiding cross-talk. In step 306, only the bio-samples 400A emit a first fluorescent signal 400AS. The divergent first fluorescent signal 400AS may be focused by the lens 114 to result in greater signal intensity, and then may be detected by the photodetector 118.

Next, referring to step 308 of FIG. 3 and FIG. 4B, the second detecting step is performed to obtain a second fluorescent signal 400BS emitted from the bio-samples 400B immobilized on the reaction sites 108 corresponding to the second sub-polarizing units 104B. In particular, the front polarizing element 110 is oriented to have the same polarizing angle as the second polarizing angle of the second sub-polarizing units 104B. The bio-samples 400B are irradiated with the polarized excitation light 112' that passes through the front polarizing element 110 and the second sub-polarizing units 104B. Meanwhile, the bio-samples 400A are not irradiated with the polarized excitation light 112' since the first sub-polarizing units 104A block the polarized excitation light 112', and thus no fluorescent signal is generated from the bio-samples 400A, thereby avoiding cross-talk. In step 308, only the bio-samples 400B emit a second fluorescent signal 400BS. The divergent first fluorescent signal 400BS may be focused by the lens 114 to result in greater signal intensity, and then may be detected by the photodetector 118.

Next, referring to step 310 of FIG. 3, the first fluorescent signal 400AS and the second fluorescent signal 400BS are combined to obtain a complete fluorescent signal from bio-samples 400A and 400B, thereby completing the bio-detection. In particular, two images respectively including the first fluorescent signal 400AS and the second fluorescent signal 400BS may be merged followed by analysis of the merged image to obtain a complete fluorescent signal. Alternatively, an image including the first fluorescent signal 400AS and an image including the second fluorescent signal 400BS may be analyzed respectively followed by the combination of the results from two images. The aforementioned image may be analyzed by the presence of fluorescent signals from the bio-samples, or by the fluorescence spectrum of the fluorescent signals to differentiate the different molecules immobilized on the reaction sites 108. Although the sequence of the first detecting step and the second detecting step are described above, it should be understood that the second detecting step may be performed before the first detecting step.

To summarize the above, according to some embodiments of the disclosure, the polarizing array of the bio-chip may include first sub-polarizing units having a first polarizing angle and second sub-polarizing units having a second polarizing angle. The first polarizing angle is different from the second polarizing angle. In addition, according to some embodiments of the disclosure, the bio-detection system may include a front polarizing element that is orientable by rotation to have the same polarizing angle as the first polarizing angle or the second polarizing angle. With such configurations accompanied by a two-step detecting method, crosstalk between fluorescent signals of neighboring reaction sites may be reduced, and the bio-chip may be fabricated to have higher array density.

Although some embodiments of the present disclosure and their advantages have been described in detail, it should be understood that various changes, substitutions and alterations can be made herein without departing from the spirit and scope of the disclosure as defined by the appended claims. For example, it will be readily understood by one of ordinary skill in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A bio-chip, consisting essentially of:
   a polarizing array having a first surface and a second surface on an opposite side of the polarizing array than the first surface, the polarizing array comprising first sub-polarizing units having a first polarizing angle and second sub-polarizing units having a second polarizing angle that is different from the first polarizing angle;
   a first substrate through which excitation light from an excitation light source can be transmitted, the first substrate provided on the first surface of the polarizing array;
   a sample isolation layer provided on the second surface of the polarizing array, the sample isolation layer comprising a plurality of reaction sites defined in the sample isolation layer that are in contact with the second surface of the polarizing array, wherein each of the plurality of reaction sites corresponds to one of the first sub-polarizing units or one of the second sub-polarizing units.

2. The bio-chip as claimed in claim 1, wherein the plurality of reaction sites is formed as nanowells or nanopatterns.

3. The bio-chip as claimed in claim 1, wherein at least one of the first sub-polarizing units is directly adjacent to the second sub-polarizing units, and is spaced apart from other first sub-polarizing units by the second sub-polarizing units.

4. The bio-chip as claimed in claim 1, wherein the first sub-polarizing units and the second sub-polarizing units have a triangular shape, a rectangular shape, or a hexagonal shape.

5. The bio-chip as claimed in claim 1, wherein the first substrate is transparent or semi-transparent.

6. The bio-chip as claimed in claim 1, further comprising a planarization layer disposed between the plurality of reaction sites and the polarizing array.

7. The bio-ship as claimed in claim 1, wherein the plurality of reaction sites are modified to immobilize a bio-sample on the plurality of reaction sites.

8. The bio-chip as claimed in claim 1, further comprising:
   a second substrate disposed opposite to the first substrate; and
   a spacer layer disposed between the first substrate and the second substrate; and
   a microfluidic channel defined between the first substrate and the second substrate, wherein the plurality of reaction sites face the microfluidic channel, and wherein the microfluidic channel is configured to guide a bio-sample to the plurality of reaction sites.

9. The bio-chip as claimed in claim 1, wherein a difference of absolute values between the first polarization angle and the second polarization angle is greater than 0° and less than 180°.

10. The bio-chip as claimed in claim 9, wherein the difference of the absolute values between the first polarization angle and the second polarization angle is 90°.

11. A bio-detection system, comprising:
    an excitation light source configured to emit an excitation light;
    a front polarizing element configured to polarize the excitation light;
    the bio-chip as claimed in claim 1 configured to receive the polarized excitation light;
    a lens configured to collect an emission light from a bio-sample immobilized on the plurality of reaction sites of the bio-chip; and a
    photodetector configured to detect the emission light.

12. The bio-detection system as claimed in claim 11, wherein the front polarizing element is orientable by rotation so that the front polarizing element has a polarizing angle that is the same as either the first polarizing angle or the second polarizing angle.

13. The bio-detection system as claimed in claim 11, wherein a difference of absolute values between the first polarization angle and the second polarization angle is 90°.

14. The bio-detection system as claimed in claim 11, further comprising a filter element for filtering the excitation light from entering the photodetector.

15. The bio-detection system as claimed in claim 11, wherein the excitation light source comprises a plurality of sub-excitation light sources, and wherein each of the plurality of sub-excitation light sources emits an excitation light with one excitation light wavelength.

16. The bio-detection system as claimed in claim 11, further comprising a light splitting element configured to direct the excitation light toward the bio-chip.

17. The bio-detection system as claimed in claim 16, wherein the light splitting element includes a dichroic filter with a reflection property for short wavelength and a transmission property for long wavelength.

18. A bio-detection method, comprising:
    providing the bio-detection system as claimed in claim 11;
    immobilizing bio-samples on the plurality of reaction sites of the bio-chip;
    performing a first detecting step to obtain a first fluorescent signal emitted from the bio-samples immobilized on the plurality of reaction sites corresponding to the first sub-polarizing units;
    performing a second detecting step to obtain a second fluorescent signal emitted from the bio-samples immobilized on the plurality of reaction sites corresponding to the second sub-polarizing units; and combining the first fluorescent signal and the second fluorescent signal.

19. The bio-detection method as claimed in claim 18, wherein the first detecting step comprises:

orienting the front polarizing element so that the front polarizing element has a polarizing angle that is the same as the first polarizing angle; and irradiating the bio-samples immobilized on the plurality of reaction sites corresponding to the first sub-polarizing units with the excitation light passing through the front polarizing element and the first sub-polarizing units.

20. The bio-detection method as claimed in claim 18, wherein the second detecting step comprises:

orienting the front polarizing element so that the front polarizing element has a polarizing angle that is the same as the second polarizing angle; and irradiating the bio-samples immobilized on the plurality of reaction sites corresponding to the second sub-polarizing units with the excitation light passing through the front polarizing element and the second sub-polarizing units.

* * * * *